United States Patent
Hananaka

(10) Patent No.: US 6,625,353 B2
(45) Date of Patent: Sep. 23, 2003

(54) OPTICAL MODULE, ALIGNMENT METHOD OF OPTICAL MODULE, AND ALIGNMENT DEVICE OF OPTICAL MODULE

(75) Inventor: Kenjiro Hananaka, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/165,512

(22) Filed: Jun. 7, 2002

(65) Prior Publication Data

US 2002/0186922 A1 Dec. 12, 2002

(30) Foreign Application Priority Data

Jun. 8, 2001 (JP) .......................... 2001-173556

(51) Int. Cl.[7] .............................................. G02B 6/32
(52) U.S. Cl. .......................................... 385/33; 385/52
(58) Field of Search ................................ 385/24, 30, 33, 385/14, 50, 52, 147

(56) References Cited

U.S. PATENT DOCUMENTS

| | | | | |
|---|---|---|---|---|
| 2002/0028045 A1 | * | 3/2002 | Yoshimura et al. | 385/50 |
| 2002/0039464 A1 | * | 4/2002 | Yoshimura et al. | 385/14 |
| 2002/0097962 A1 | * | 7/2002 | Yoshimura et al. | 385/50 |
| 2002/0131701 A1 | * | 9/2002 | Zhu | 385/33 |

FOREIGN PATENT DOCUMENTS

JP         09-061666         3/1997

* cited by examiner

Primary Examiner—Akm Enayet Ullah
(74) Attorney, Agent, or Firm—Merchant & Gould P.C.

(57) ABSTRACT

A light coupling means 4 is provided with a collimator lens 41 and a half mirror 42. After reference light is changed to parallel light by the collimator lens 41, the parallel light is folded back by the half mirror 42 in the same direction as object light emitted from a microlens array 32 to overlap the object light, thereby generating interference patterns.

11 Claims, 7 Drawing Sheets

Interference patterns (a)

Phase shift W of wave front (b)

Maximum phase shift W1 of beam diameter e = -5λ

Maximum phase shift W2 of beam diameter e = -2λ

Optical axis shift amount Δy (c)

Δy1=38.75    Δy2=15.5

OPTICAL MODULE, ALIGNMENT METHOD OF OPTICAL MODULE, AND ALIGNMENT DEVICE OF OPTICAL MODULE

BACKGROUND OF THE INVENTION

1. Field of the Invention

The present invention relates to an alignment method for aligning optical axes of an optical fiber array and a microlens array which form an optical module, the optical module aligned by the alignment method, and a device for performing the alignment method.

2. Description of the Prior Art

An optical module for optical communication which coupled an optical fiber array to a microlens array is known. This module is provided to cause light from a light emitting diode to enter the microlens through an optical fiber and to take it out as collimated light or to cause the collimated light to enter the optical fiber through the microlens.

In such an optical module, it is essential for the optical axes of the optical fiber and the microlens to agree with each other for improvement of communication accuracy. An optical axis adjustment method for this optical module is disclosed in Japanese Unexamined Patent Publication No. Hei 9-061666.

In this prior art, a mask having a mesh-shaped pattern of the same array pitch as that of an optical fiber array and a collimation lens array (i.e., microlens array) is provided in front of a detector which detects light beam shape. Light is caused to enter the collimation lens array through the optical fiber array, and the light emitted from the collimation lens array and passed without being blocked off by the mask is sensed by the detector. A relative position of the optical fiber array and the collimation lens array is adjusted so that the light beam shape corresponding to each optical fiber can be uniform.

However, even though the optical axis adjustment is made according to the conventional method stated above, it is only possible to make extremely rough adjustment. Further, even when the relative position of the optical fiber array and the collimation lens array is adjusted, it is still not clear in which direction and to which extent the adjustment should be made.

SUMMARY OF THE INVENTION

To solve the problems stated above, an alignment method of an optical module according to the present invention is provided, in which alignment of the optical module comprising an optical fiber array in which a plurality of optical fibers are disposed in one or two-dimensional manner and a microlens array in which a plurality of microlenses are disposed in one or two-dimensional manner is made, characterized in that a laser beam emitted from a laser beam source is split into object light and reference light and the object light is caused to enter at least one of the plurality of optical fibers and to emit from the microlens array, wherein the reference light is provided to overlap the emitted object light so as to generate interference patterns, thereby making fine adjustments to relative position of the optical fiber array and the microlens array based on the interference patterns.

An alignment device of the optical module according to the present invention comprises a means for splitting a laser beam from a laser beam source into object light and reference light, a means for guiding the object light to an optical fiber, a light coupling means for overlapping the object light emitted from a microlens array and the reference light each other to generate interference patterns, light observation means for observing the interference patterns, and a means for make fine adjustment to relative position of an optical fiber array and the microlens array based on the interference patterns.

In this manner, the interference patterns of the object light and the reference light greatly change even by slight shift or deviation of the optical axis. Accordingly, it is possible to precisely make fine adjustments to the optical axis using these interference patterns.

An efficient alignment method is provided in which the object light is caused to enter two optical fibers and to overlap reference light so as to generate two interference patterns, wherein fine adjustments are made to relative position of the optical fiber array and microlens array to allow the two interference patterns to approximate. In this case, it is desirable that the two interference patterns be the same with each other, but they don't have to be completely the same.

To allow the object light to enter the two optical fibers, the object light split by a light splitter is caused to enter the two optical fibers forming the optical fiber array through a coupling member.

For comparison of the two interference patterns, wave front phase analysis software is installed within a control device such as a personal computer, wherein the wave front phase is analyzed from the interference fringes of the two interference patterns to allow these wave front phases to approximate.

It is possible to know the direction and tendency of the optical axis shift or deviation by changing the interference patterns. To change the interference patterns, for example, a phase of the object light or reference light can be shifted. To shift the phase, a phase shifting means is provided in the optical path of the reference light or the optical path of the object light emitted from the microlens array.

For observational interference patterns, the interference patterns on the position spaced away predetermined distance from the microlens array are used. Specifically, the laser beam is a Gausian beam provided with a beam waist. When the beam waist position is set to be an observation position, the wave front phase becomes a plane wave.

The light observation means shall be provided with an image input element such as a CCD camera or a camera tube, and an optical system for forming an image in a position spaced apart a predetermined distance from the microlens on the image input element.

If the alignment is made using the above method and device, the target optical module can be obtained by bonding the optical fiber array and the microlens array together in such a condition.

BRIEF DESCRIPTION OF THE DRAWINGS

The above and other objects, features and advantages of the present invention will become more apparent from the following description when taken in conjunction with the accompanying drawings.

DETAILED DESCRIPTION OF THE PREFERRED EMBODIMENTS

Figure 1:
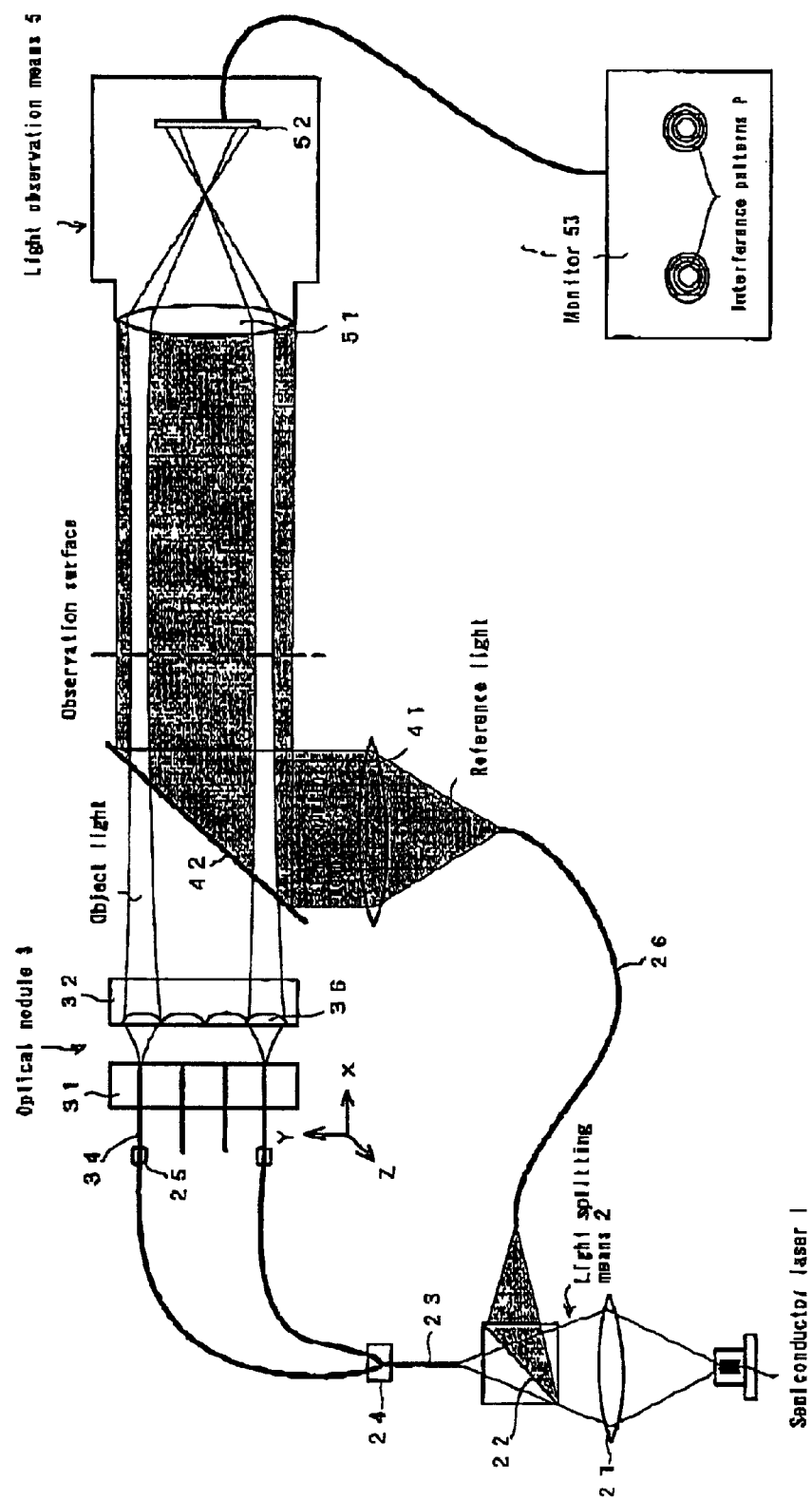
FIG. 1 is a schematic diagram showing a device for use in an alignment method of the present invention.

Preferred embodiments of the present invention will now be described with reference to the accompanying drawings. FIG. 1 is a schematic diagram of a device for use in an alignment method of the present invention. Reference numeral 1 is a semiconductor laser serving as a light-emitting source, 2 is a light-splitting means for splitting a laser beam from the semiconductor laser into object light and reference light, and 3 is an optical module. 4 is a light coupling means for overlapping the object light transmitted through the optical module and the reference light each other, and 5 is a light observation means for observing an interfering pattern caused by overlapping the object light and the reference light each other.

The light-splitting means 2 is provided with a coupling lens 21 and a beam splitter 22. A laser beam is split into object light and reference light by the beam splitter 22. The object light is connected to two optical fibers of an optical fiber array 31 forming the optical module 3 through a single mode optical fiber 23, a light-branching section 24, and a coupling 25. The reference light is fed to the light coupling means 4 through a single mode optical fiber 26.

Figure 2:
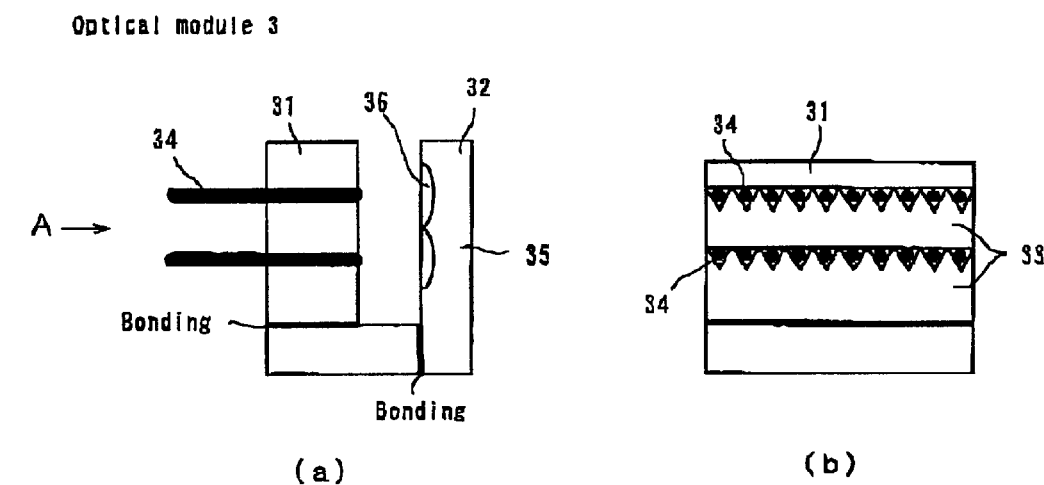
FIG. 2(a) is a side view showing one example of an optical module and FIG. 2(b) is a view taken in the direction of the arrow A of FIG. 2(a) showing an optical fiber array.

FIG. 2(a) is a side view showing one example of an optical module and FIG. 2(b) is a view taken in the direction of the arrow A of FIG. 1(a) showing an optical fiber. The optical module 3 is composed of the optical fiber array 31 and a microlens array 32. The optical fiber array 31 and the microlens array 32 are firmly secured to the optical module 3 after completed as a finished product. However, one of them (i.e. the optical fiber array 31) is slightly movable in the direction of X, Y, and Z axes and rotatable around each axis by a known means because adjustment of the optical axis is conducted in the present invention.

The optical fiber array 31 has a silicon substrate 33 provided with V-grooves at regular intervals in one or two-dimensional shape, and single mode optical fibers 34 are secured in the grooves. The optical fiber array 31 is not necessarily limited this construction, but it may be formed in such a manner that a stainless steel substrate or glass substrate is formed with openings in advance into which the optical fibers are inserted and secured.

The microlens array 32 has a glass substrate 35 provided with a plurality of microlenses 36 corresponding to the optical fibers 34. The microlens 36 can be formed by 2P molding method using ultraviolet ray-setting resin, a method whereby an etching is effected on a glass substrate surface through a mask to form many recessions into which resin of high refractive index is filled, a method whereby ions are diffused on a glass substrate surface through a mask to change a refractive index, etc.

The light coupling means 4 is provided with a collimator lens 41 and a half lens 42. After reference light is changed to parallel light by the collimator lens 41, the parallel light is folded back by the half mirror 42 in the same direction as object light emitted from the microlens array 32 to overlap the object light, thereby generating an interference pattern.

The light observation means 5 is composed of a CCD camera or a camera tube provided with an image formation lens 51 and a photodetector 52. The interference pattern on an observation surface on the downstream side of the light coupling means 4 is formed on the photodetector 52 and displayed on a monitor 53.

Figure 3:
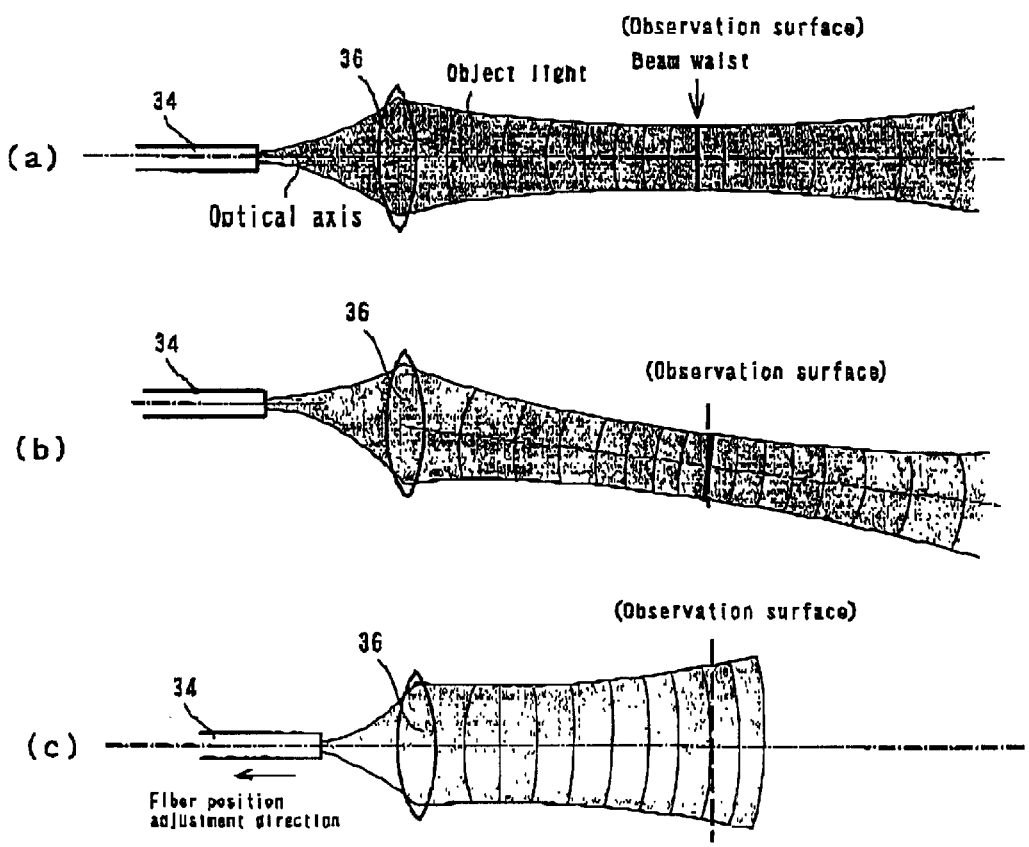
FIG. 3(a) is a view explaining the wave front of object light in the case where an optical axis of an optical fiber agrees with that of a microlens and FIG. 3(b) is a view explaining the wave front of object light in the case where the optical axis of the optical fiber does not agree with that of the microlens and FIG. 3(c) is a view explaining the wave front of the object light in the case where an optical axis of an optical fiber agrees with the that of a microlens but the observation surface is situated off the beam waist of the object light.
Figure 4:
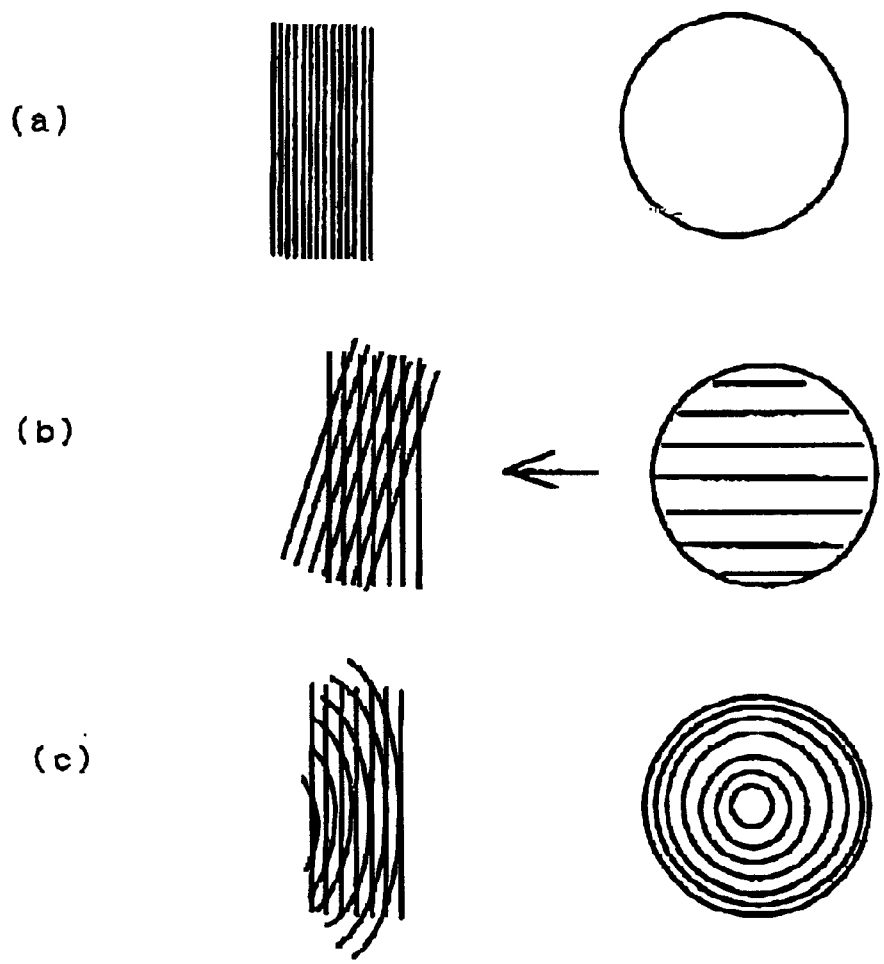
FIGS. 4(a) to (c) are views showing the conditions in which object light and reference light overlap each other and interference patterns caused by the overlapping conditions.

The interference pattern will now be described. FIGS. 3(a) and (b) are views showing wave fronts of the object light. FIG. 3(a) show the case where an optical axis of the optical fiber 34 agrees with that of the microlens 36 while FIG. 3(b) shows the case where the optical axis of the optical fiber 34 does not agree with that of the microlens 36. FIGS. 4(a) through (c) are views showing the overlapping conditions of the object light and the reference light, and the interference patterns caused by such conditions.

As shown in FIG. 3(a), when the optical axis of the optical fiber 34 agrees with that of the microlens 36 and the observation surface is situated on the beam waist of the object light, the wave front of the object light becomes parallel to that of the reference light as shown in FIG. 4(a). In this case, the interference fringe (i.e., interference pattern) is not visible.

As shown in FIG. 3(b), when the optical axis of the optical fiber does not agree with that of the microlens, but the observation surface is situated on the beam waist of the object light, the object light is a plane wave, but not parallel to the wave front of the reference light as shown in FIG. 4(b). In this case, linear interference fringes are generated.

As shown in FIG. 3(c), when the optical axis of the optical fiber agrees with that of the microlens, but the observation surface is situated off the beam waist of the object light, the wave front of the object light becomes a spherical wave. In this case, concentric interference fringes are generated as shown in FIG. 4(c).

The interference fringes show equiphase line (i.e., contour line) of the wave front of the object light generated by causing the object light to interfere with the reference light. The narrower the interval between the equiphase lines at the interference fringes of the plane wave, the greater the deviation or shift in the direction perpendicular to the optical axis.

The spherical wave is generated because the observation surface is situated off the beam waist. Accordingly, as shown by the arrow in FIG. 3(c), the interference fringes can be removed by relatively moving the optical fiber array in the direction of the optical axis.

Figure 5:
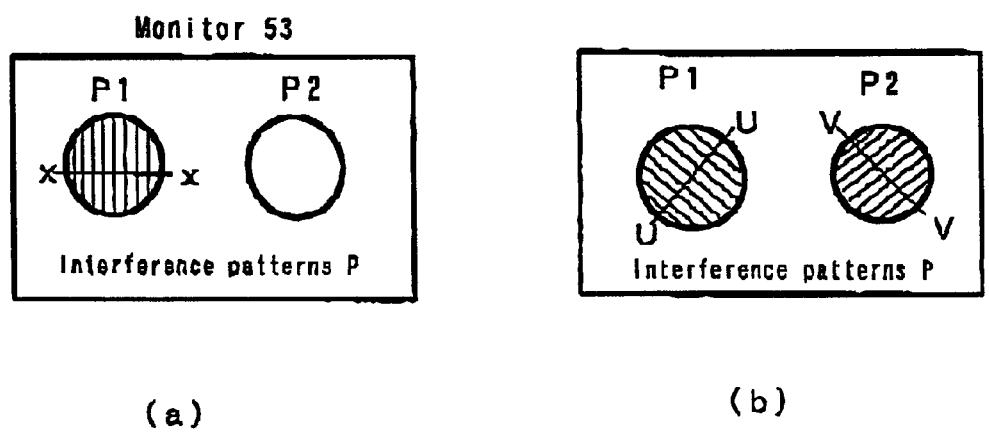
FIGS. 5(a) and (b) are views showing the conditions in which two interference patterns are displayed on a monitor.

Meanwhile, in the embodiment, since the object light is caused to enter two optical fibers, as shown in FIG. 5(a) or (b), two interference patters P1 and P2 are displayed on a monitor. According to the example shown in FIG. 5(a), the optical axes of the optical fiber and microlens corresponding to the interference pattern P1 shift in the direction of X—X while no shift is produced between the optical axes of the optical fiber and microlens. On the other hand, according to the example shown in FIG. 5(b), the optical axes of the optical fiber and microlens corresponding to the interference pattern P1 shift in the direction of U—U while the optical axes of the optical fiber and microlens corresponding to the interference pattern P2 shift in the direction of V—V.

In this manner, when the interference patters more than two (of course, the interference patterns can be formed using all the optical fibers and microlenses) are generated, adjustment may be made to make the least square error of all the shift or deviation minimal or to make the worst shift or deviation minimal.

Figure 6:
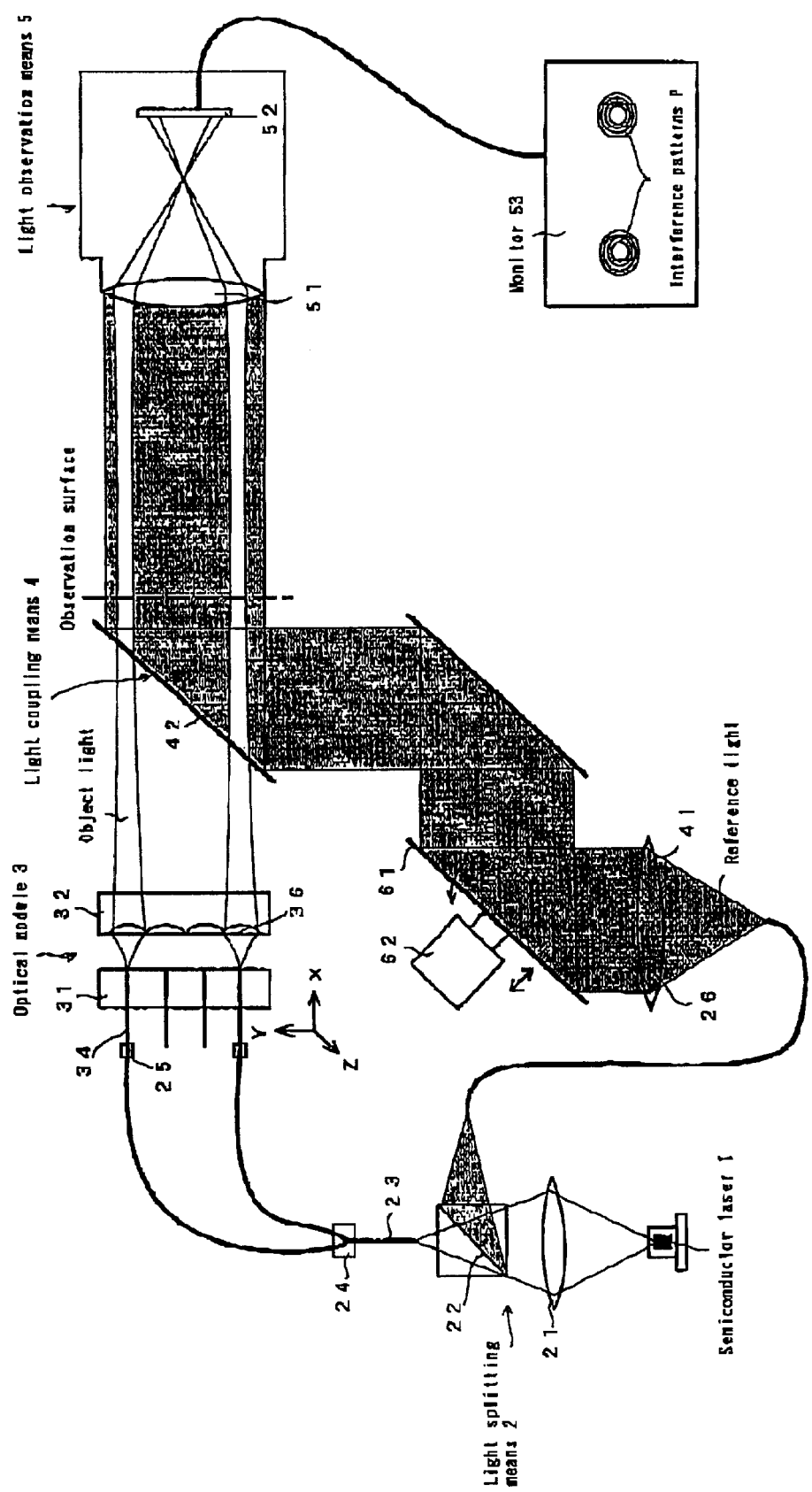
FIG. 6 is a view similar to FIG. 1 showing another embodiment.

FIG. 6 is a view similar to FIG. 1 showing another embodiment. In this embodiment, a phase-shifting means 6 is provided in an optical path of the reference light. This phase-shifting means 6 is caused to move a mirror 61 which reflects the parallel light from the collimator lens 41 toward the half mirror 42 by $\lambda/4$, $\lambda/2$ or 3 $\lambda/4$ by a piezoelectric element 62 such as PZT so that a plurality of interference patterns can be image-input into the light observation means 5 for analysis. In this manner, it is possible to precisely quantify the phase shift of the wave front including a sign of plus and minus of the phase shift (the so-called "Fringe Scanning Method" or "Phase-shifting Method").

Figure 7:
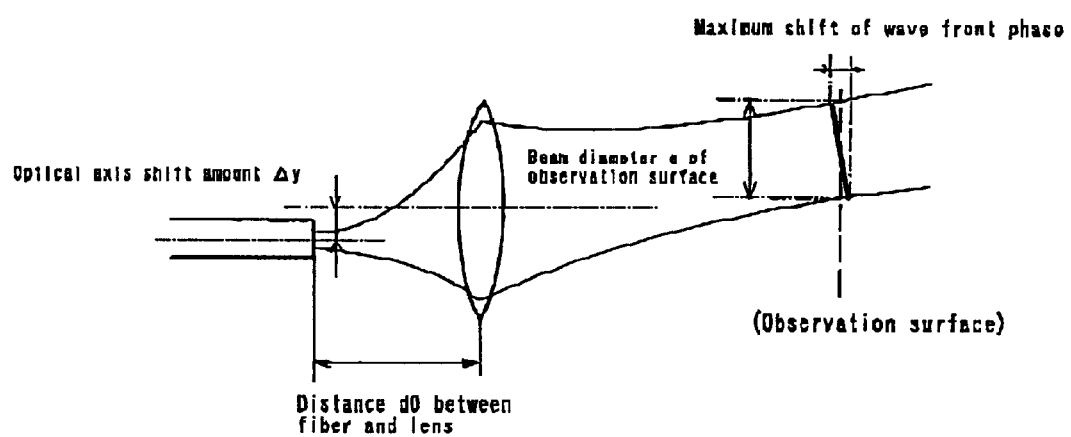
FIG. 7 is a view schematically explaining the maximum shift of a wave front phase.

Next, quantification of the shifting dimensions and direction of the optical axis will be described. In FIG. 7, if the shift amount of the optical axis between the optical fiber and the lens is $\Delta y$, the distance between the optical fiber and the lens is d0, the beam diameter of the observation surface is e, and the wavelength is $\lambda$ and provided that no shift is produced in the direction of the optical axis for the sake of convenience, the maximum shift or deviation W of the wave front phase (unit: wavelength $\lambda$) is expressed in he following formula (1):

$$W=(e \cdot \Delta y)/(d0 \cdot \lambda) \qquad (1)$$

When the phase shift observed from the formula (1) is W, the shift amount $\Delta y$ of the optical axis is expressed in the following formula (2):

$$\Delta y = W \cdot d0 \cdot \lambda/e \qquad (2)$$

Figure 8:
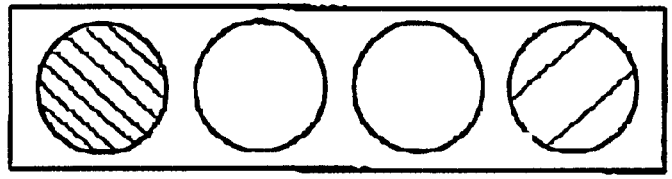
FIG. 8 is a view showing interference patterns, a phase shift of a wave front, and a shift amount of an optical axis.
Figure 8:
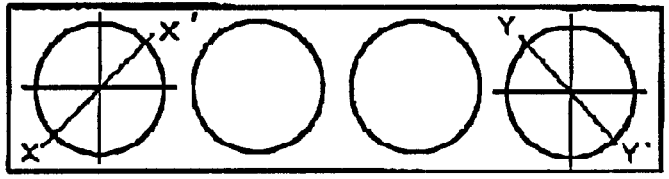
Figure 8:
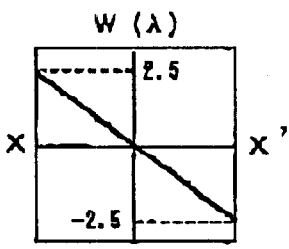
Figure 8:
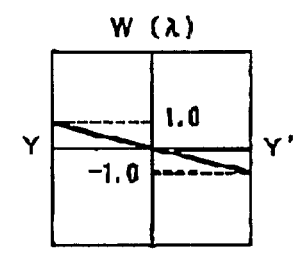
Figure 8:
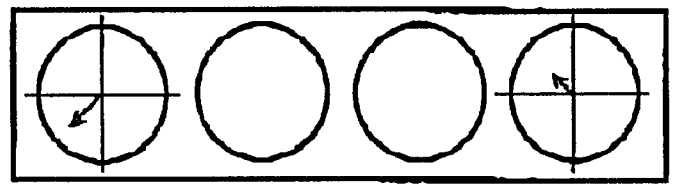

For example, assuming that the interference fringes shown in FIG. 8(a) are obtained by making observation at both ends of the array, the wave front phase shown in FIG. 8(b) is obtained from this interference fringes. As shown in FIG. 8(c), each optical axis shift amount $\Delta y1$, $\Delta y2$ at both ends of the array including the direction can be found.

Specifically, if d0=1 mm, $\lambda$=1.55 $\mu$m, and e=200 $\mu$m, $\Delta y1$=38.75 $\mu$m and $\Delta y2$=15.5 $\mu$m.

Figure 9:
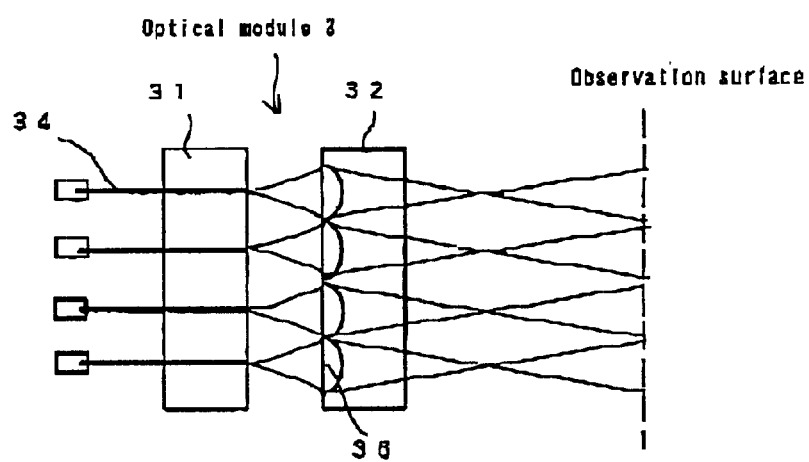
FIG. 9 is a view showing another embodiment of an optical module.

In the present embodiment, the optical module whereby the light emitted from the microlens array becomes the parallel light is shown, but as shown in FIG. 9, light may be caused to enter the optical module in which object light has a focal point at a predetermined position.

Further, the optical path for providing the phase shifting means 6 can be that for object light.

As described above, according to the present invention, it is possible to precisely adjust the shift or deviation of the optical axes of the optical fiber and the microlens corresponding thereto. It is also possible to make an alignment operation easier because adjustment is made by making use of the interference fringes.

What is claimed is:

1. An alignment method of an optical module comprising an optical fiber array in which a plurality of optical fibers are disposed in one or two-dimensional manner and a microlens array in which a plurality of microlens are disposed in one or two-dimensional manner for aligning optical axes of the optical fibers and the microlens corresponding the optical fibers, the alignment method further comprising the steps of:
   splitting a laser beam emitted from a laser beam source into object light and reference light;
   causing the object light to enter at least one of the plurality of optical fibers and to emit from the microlens array;
   overlapping the emitted object light and the reference light to generate interference patterns, and
   making fine adjustments to a relative position of the optical fiber array and the microlens array based on the interference patterns.

2. The alignment method of an optical module according to claim 1, wherein the object light is caused to enter two optical fibers and to overlap the reference light so as to generate two interference patterns, wherein fine adjustments are made to a relative position of the optical fiber array and the microlens array to allow these two interference patterns to approximate.

3. The alignment method of an optical module according to claim 2, wherein a wave front phase analyzed from interference fringes of the two interference patterns are caused to approximate.

4. The alignment method of an optical module according to claim 1, wherein a phase of the object light or the reference light is shifted to change the interference patterns.

5. The alignment method of an optical module according to claim 1, wherein the interference patterns are observed at a position spaced apart a predetermined distance from the microlens array.

6. The alignment method of an optical module according to claim 5, wherein the position for observing the interference patterns is the position where the wave front phase is approximate to a plane wave.

7. The alignment method according to claim 1, wherein the optical module is provided by aligning the optical fiber array and the microlens array, and the optical fiber array and the microlens array are bonded together in such a condition.

8. An alignment device of an optical module comprising an optical fiber array in which a plurality of optical fibers are disposed in one or two-dimensional manner and a microlens array in which a plurality of microlenses are disposed in one or two-dimensional manner for aligning optical axes of the optical fibers and the microlens corresponding to the optical fibers, the alignment device further comprising:
   splitting means for splitting a laser beam emitted from a laser beam source into object light and reference light;
   means for guiding the object light to the optical fibers;
   light coupling means for overlapping the object light emitted from the microlens array and the reference light to generate interference patterns;
   light observation means for observing the interference patterns; and
   means for making fine adjustments to a relative position of the optical fiber array and the microlens array based on the interference patterns.

9. The alignment device of an optical module according to claim 8, wherein another light coupling means for allowing the object light to enter the two optical fibers forming the optical fiber array is provided in an optical path of the object light.

10. The alignment device of an optical module according to claim 8, wherein a phase shifting means is provided in an optical path of the reference light or in an optical path of the object light emitted from the microlens array.

11. The alignment device of an optical module according to claim 8, wherein the light observation means is provided with an image input element such as a CCD camera or a camera tube, and an optical system for forming an image in a position spaced apart a predetermined distance from the microlens on the image input element.

* * * * *

UNITED STATES PATENT AND TRADEMARK OFFICE
CERTIFICATE OF CORRECTION

PATENT NO. : 6,625,353 B2
DATED : September 23, 2003
INVENTOR(S) : Hamanaka

It is certified that error appears in the above-identified patent and that said Letters Patent is hereby corrected as shown below:

Title page,
Below Item [12], United States Patent, "Hananaka" should read -- Hamanaka --
Item [75], Inventor, "Kenjiro Hananaka," should read -- Kenjiro Hamanaka, --

Signed and Sealed this

Sixth Day of July, 2004

JON W. DUDAS
*Acting Director of the United States Patent and Trademark Office*